Figure 1:
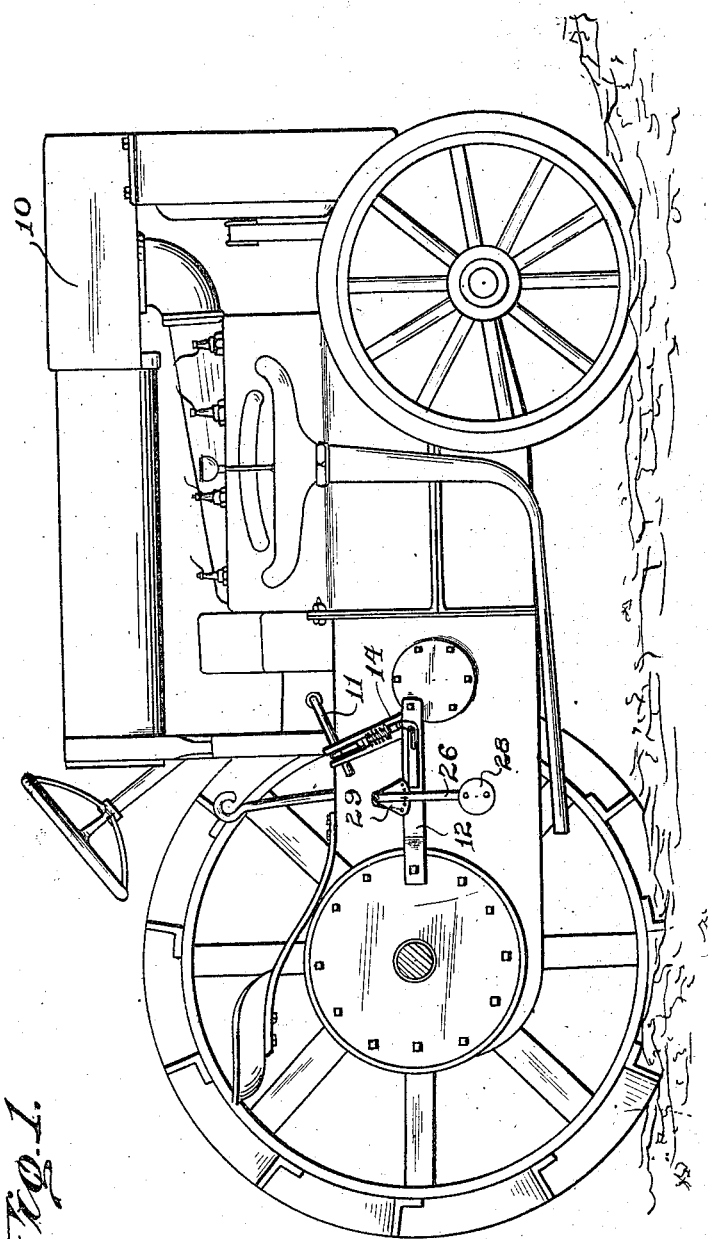

May 1, 1923.

J. S. RAIRDEN

SAFETY DEVICE FOR TRACTORS

Filed Aug. 10, 1921

1,453,995

2 Sheets-Sheet 1

Inventor
J. S. Rairden

By Lacey & Lacey, Attorney

May 1, 1923.                                                    1,453,995
J. S. RAIRDEN
SAFETY DEVICE FOR TRACTORS
Filed Aug. 10, 1921                              2 Sheets-Sheet 2
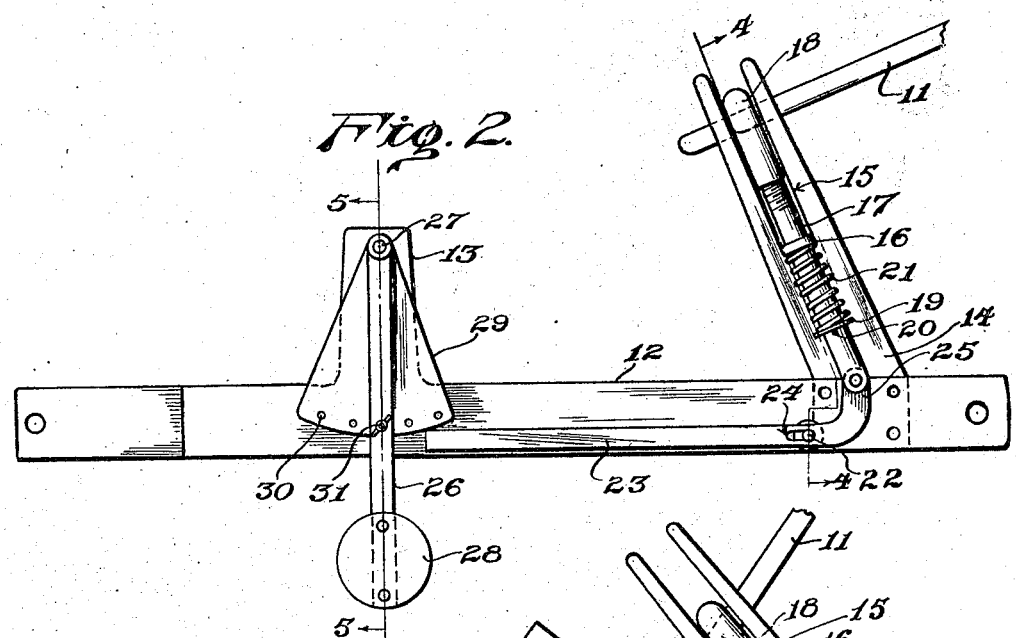
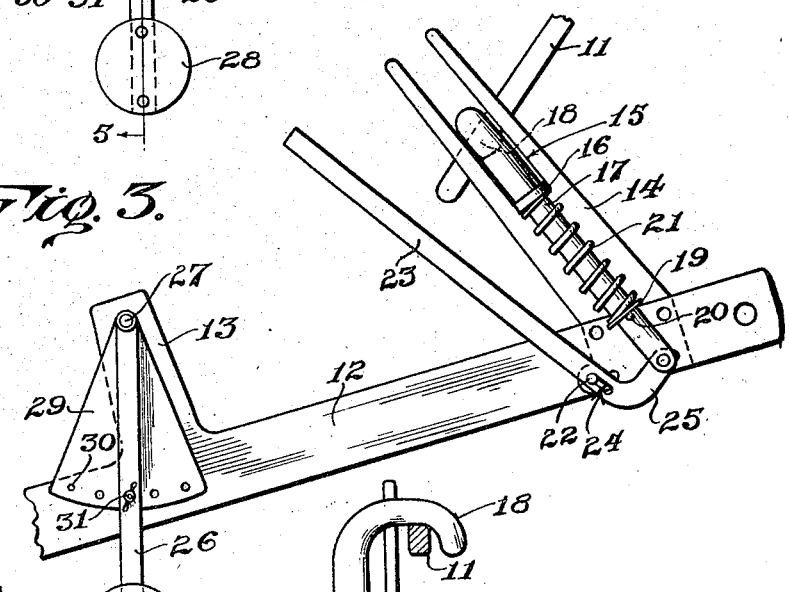
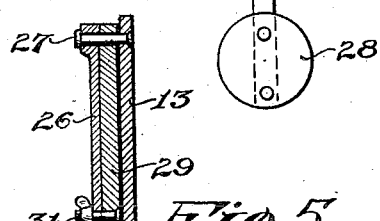
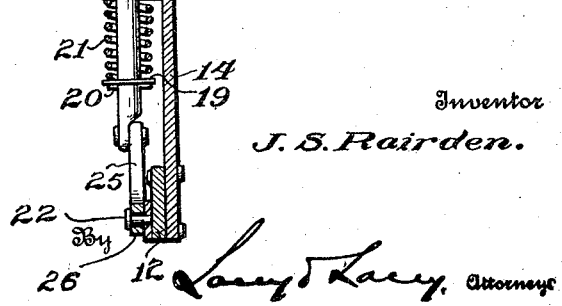
Inventor
J. S. Rairden.
By Lacey & Lacey, Attorneys Patented May 1, 1923.

1,453,995

UNITED STATES PATENT OFFICE.

JAMES S. RAIRDEN, OF WATERFORD, CALIFORNIA.

SAFETY DEVICE FOR TRACTORS.

Application filed August 10, 1921. Serial No. 491,230.

*To all whom it may concern:*

Be it known that I, JAMES S. RAIRDEN, citizen of the United States, residing at Waterford, in the county of Stanislaus and State of California, have invented certain new and useful Improvements in Safety Devices for Tractors, of which the following is a specification.

This invention relates to an improved safety device for tractors, and has as one of its principal objects to provide a device which will automatically operate to prevent a tractor from turning over backwards.

A further object of the invention is to provide a device which, when the forward end of the tractor starts to tip upwardly, will operate to disengage or release the clutch of the tractor for disconnecting the motive power from the drive wheels so that the front end of the tractor will immediately drop.

And the invention has a still further object to provide a device which may be readily applied, which will not be in the way, and which, in practical use, will operate dependably.

Other and incidental objects will appear hereinafter.

In the drawings:

Figure 1 is a side elevation of a tractor equipped with my improved safety device, parts being broken away and illustrated in section, Figure 2 is a side elevation showing the device in detail, Figure 3 is an elevation of the device showing the latch released, Figure 4 is a section on the line 4—4 of Figure 2, looking in the direction of the arrows, and Figure 5 is a section on the line 5—5 of Figure 3, looking in the direction of the arrows.

As is more or less well known, tractors of a light type now on the market, are subject to the serious defect in that such tractors, when overloaded, exhibit a marked tendency to turn over backwards. This tendency may be ascribed to several causes but the fact remains that a tractor will, even on level ground, turn over backwards when the draw-bar pull becomes too great and since, when the forward end of the tractor starts to tilt upwardly, the motive power of the tractor, instead of being utilized for turning the drive wheels, is diverted in such manner as to swing the body of the tractor about the drive axle thereof, it will be seen that the tractor will tip upwardly and backwardly very quickly. Accordingly, the consequent danger in this regard incident to operating a tractor, will be at once appreciated, and my invention seeks to provide a device which will entirely eliminate such danger.

As previously indicated, the device is particularly designed for use in connection with light inexpensive tractors, of a type now used to a considerable extent, and I have so shown and will describe the invention accordingly. However, I do not limit myself in this regard since the device will prove entirely efficient wherever found applicable.

In Figure 1 of the drawings, the tractor is indicated at 10 and the usual clutch pedal thereof at 11, this pedal being adapted to be swung downwardly for disengaging or releasing the clutch of the tractor and accordingly disconnecting the motive power from the drive wheel. In carrying the invention into effect, I employ a body bar 12 offset at its rear end portion and, as shown in Figure 1, bolted at its ends to the tractor beneath the pedal 11. Upstanding from the body bar near its rear end is a post 13 which may be integrally formed on or otherwise secured to the bar and mounted upon said bar near its forward end is an upstanding rearwardly inclined bracket 14. Formed in the upper end portion of this bracket is a medial longitudinally directed slot 15 at the lower end of which is a lateral guide lug 16 and slidable through said lug is a preferably tubular rod 17 upon the upper end of which is threaded a hook 18 extending over the pedal 11. Surrounding the rod is a washer 19 sustained by a pin 20 extending through the rod and bearing between said washer and the guide lug 16 is a spring 21 pressing the rod downwardly.

Extending laterally from the body bar 12 at one side thereof is a headed pivot stud 22 and mounted to rock upon said stud is a latch 23 having a longitudinally directed slot 24 therein freely receiving the stud therethrough so that the latch may also slide upon the stud. As will be observed, the latch is in the nature of a bell crank and is provided at its inner end with a laterally directed short arm 25 pivotally connected to the lower end of the rod 17.

Mounted to swing upon the post 13 is a pendulum 26 supported by a bolt 27 extending through the post, the pendulum being provided at its lower end with a weight 28. Swingingly mounted upon the bolt 27 behind the pendulum is a sector 29 provided near its wider end with a plurality of spaced openings 30 and engageable through said openings selectively and through the pendulum, is a bolt 31 preferably equipped at its outer end with a wing nut. As will thus be seen, this construction provides an arrangement whereby the sector may be adjustably positioned with respect to the pendulum and, as shown in Figure 1, the sector is normally engaged over the free end of the latch 23 for holding the rod 17 and hook 18 elevated against the tension of the spring 21. Thus, in the normal position of the parts, as shown in Figure 2, the hook will lie above the upper limit of the throw of the pedal 11 so that the pedal may be operated without interference for actuating the clutch of the tractor. However, upon upward tilting of the forward end of the tractor, the body bar 12 will, as shown in Figure 3, of course, also be tilted, which will result in rearward swinging of the pendulum 26. The pendulum will thus, as will be seen, rock the sector 29 out of engagement with the free end of the latch 23, releasing the latch so that the spring 21 will then immediately operate to force the rod 17 downwardly, the latch 23 being swung coincidently and sliding on the stud 22 to accommodate downward travel of the rod. The hook 18 will thus be caused, under the influence of the spring 21, to swing the pedal 11 downwardly for releasing the clutch of the tractor and disconnecting the motive power of the tractor from the drive wheels. As soon as this is done, the forward end of the tractor will, of course, immediately drop. It will accordingly be seen that I provide a device which will automatically operate to prevent the tractor from turning over backwards and by adjusting the sector 29 with respect to the pendulum 26, as previously indicated, the inclination of the body bar 12 and consequently of the tractor, at which the latch 23 will be released for releasing the clutch of the tractor, may be readily varied.

Having thus described the invention, what is claimed as new is:

1. A safety device for tractors comprising a bracket to be arranged adjacent the clutch pedal of the tractor, a hook slidably mounted on the bracket and adapted to engage freely over the clutch pedal, a latch mounted for rocking movement and pivoted at its front end to the lower end of the hook, a pendulum-controlled member projecting over the rear end of the latch and restraining the same, and means associated with the hook to actuate the same and the clutch pedal and exerting force constantly on the latch in opposition to the latch-restraining means.

2. A safety device for tractors including a body bar, reciprocable spring pressed clutch pedal engaging means carried thereby, said means being normally free of the pedal, a latch mounted to rock upon the bar and pivotally connected to said pedal-engaging means, and pendulum controlled means normally securing the latch against swinging movement.

3. A safety device for tractors including a body bar, a bracket upstanding therefrom, a rod slidably connected with the bracket and provided with means to coact with a clutch pedal, yieldable means associated with the rod for shifting the rod downwardly, a latch swingingly mounted upon the body bar and pivotally connected with said rod, and pendulum controlled means for normally restraining the latch.

4. A safety device for tractors including a body bar, a bracket upstanding therefrom and provided with a slot, a rod slidably connected with the bracket, a hook upon the upper end of the rod engageable over a clutch pedal, a spring associated with the rod for projecting the rod downwardly, a latch swingingly mounted upon the body bar and pivotally connected with said rod, and pendulum controlled means for normally restraining the latch.

5. A safety device for tractors including a body bar, spring pressed clutch pedal engaging means carried thereby, a latch pivoted upon the body bar and connected with the pedal-engaging means to control the movement thereof, a pendulum carried by the bar, and pivoted means normally restraining the latch and operable by said pendulum for releasing the latch.

6. A safety device for tractors including a body bar, spring pressed clutch pedal engaging means carried thereby, a latch pivoted upon the body bar and controlling movement of said pedal-engaging means, a pendulum carried by the bar, a swingingly mounted sector bearing upon and normally restraining the latch and operable by the pendulum for releasing the latch, and means adjustably connecting the sector with the pendulum whereby the instant at which the latch will be released may be varied.

In testimony whereof I affix my signature.

JAMES S. RAIRDEN. [L. S.]